United States Patent
Beltz et al.

(10) Patent No.: US 9,444,124 B2
(45) Date of Patent: Sep. 13, 2016

(54) BATTERY CELL ASSEMBLY AND METHOD FOR COUPLING A COOLING FIN TO FIRST AND SECOND COOLING MANIFOLDS

(71) Applicant: LG Chem, Ltd., Seoul (KR)

(72) Inventors: David Beltz, Troy, MI (US); Heekook Yang, Troy, MI (US); Anthony Arena, Macomb, MI (US); Satish Ketkar, Troy, MI (US)

(73) Assignee: LG Chem, Ltd., Seoul (KR)

( * ) Notice: Subject to any disclaimer, the term of this patent is extended or adjusted under 35 U.S.C. 154(b) by 317 days.

(21) Appl. No.: 14/161,806

(22) Filed: Jan. 23, 2014

(65) Prior Publication Data

US 2015/0207187 A1    Jul. 23, 2015

(51) Int. Cl.
*F28D 1/00* (2006.01)
*H01M 10/613* (2014.01)
*B23P 15/26* (2006.01)
(Continued)

(52) U.S. Cl.
CPC .......... *H01M 10/613* (2015.04); *B23P 15/26* (2013.01); *F28F 9/0256* (2013.01); *F28F 9/0258* (2013.01); *F28F 9/06* (2013.01); *F28F 2230/00* (2013.01); *F28F 2275/04* (2013.01); *Y10T 29/49359* (2015.01)

(58) Field of Classification Search
CPC .............. H03K 17/0822; H03K 19/00315; B21D 53/08; F28F 1/22; F28F 9/0256; F28F 9/0258; F28F 9/06; F28F 2230/00; F28F 2275/04; Y02E 60/12; Y02E 60/122; H01M 10/613; B23P 15/26; Y10T 29/49359
USPC .................. 285/345, 347, 351, 338; 165/149
See application file for complete search history.

(56) References Cited

U.S. PATENT DOCUMENTS 2,210,833 A * 8/1940 Clough ................. F16L 21/025
138/119
2,273,244 A 2/1942 Cornelius
(Continued)

FOREIGN PATENT DOCUMENTS

EP       1577966 A    9/2005
EP       1852925 A    11/2007
(Continued)

OTHER PUBLICATIONS

KR 101205180 B1 Machine translation.*
(Continued)

*Primary Examiner* — Len Tran
*Assistant Examiner* — Gordon Jones
(74) *Attorney, Agent, or Firm* — Buckert Patent & Trademark Law Firm, PC; John F. Buckert

(57) ABSTRACT

A battery cell assembly having a cooling fin with a tube, a substantially rectangular-shaped metal plate, first and second cylindrical coupling members, and first and second O-ring gaskets is provided. The tube has an inlet tube portion and an outlet tube portion. The tube is coupled to a peripheral region of the metal plate. The first cylindrical coupling member has a first aperture extending therethrough, and first and second circumferential grooves. The inlet tube portion is disposed in the first aperture and coupled to the first cylindrical coupling member. The first and second O-ring gaskets are disposed in the first and second circumferential grooves, respectively. The outlet tube portion is disposed in the second aperture and is coupled to the second cylindrical coupling member.

15 Claims, 16 Drawing Sheets

(51) Int. Cl.
*F28F 9/02* (2006.01)
*F28F 9/06* (2006.01)

(56) References Cited

U.S. PATENT DOCUMENTS

| | | | |
|---|---|---|---|
| 2,391,859 A | 1/1946 | Earl | |
| 3,503,558 A | 3/1970 | Galiulo et al. | |
| 3,522,100 A | 7/1970 | Lindstrom | |
| 3,550,681 A | 12/1970 | Stier et al. | |
| 3,964,930 A | 6/1976 | Reiser | |
| 4,009,752 A | 3/1977 | Wilson | |
| 4,063,590 A | 12/1977 | Mcconnell | |
| 4,298,904 A | 11/1981 | Koenig | |
| 4,305,456 A | 12/1981 | Mueller et al. | |
| 4,322,776 A | 3/1982 | Job et al. | |
| 4,444,994 A | 4/1984 | Baker et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,982,785 A | 1/1991 | Tomlinson | |
| 4,995,240 A | 2/1991 | Barthel et al. | |
| 5,057,968 A | 10/1991 | Morrison | |
| 5,071,652 A | 12/1991 | Jones et al. | |
| 5,076,242 A * | 12/1991 | Parker | F02M 55/007 123/468 |
| 5,186,250 A | 2/1993 | Ouchi et al. | |
| 5,214,564 A | 5/1993 | Metzler et al. | |
| 5,270,131 A | 12/1993 | Diethelm et al. | |
| 5,297,823 A * | 3/1994 | Dubost | F16L 37/0842 285/23 |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,937,664 A | 8/1999 | Matsuno et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,220,343 B1 * | 4/2001 | Ichiyanagi | F28D 1/0341 165/153 |
| 6,344,728 B1 | 2/2002 | Kouzu et al. | |
| 6,362,598 B2 | 3/2002 | Laig-Horstebrock et al. | |
| 6,399,238 B1 | 6/2002 | Oweis et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,021,677 B2 * | 4/2006 | Smith, III | E21B 33/00 277/602 |
| 7,070,874 B2 | 7/2006 | Blanchet et al. | |
| 7,143,724 B2 | 12/2006 | Hashizumi et al. | |
| 7,150,935 B2 | 12/2006 | Hamada et al. | |
| 7,250,741 B2 | 7/2007 | Koo et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 8,409,743 B2 | 4/2013 | Okada et al. | |
| 2002/0182493 A1 | 12/2002 | Ovshinsky et al. | |
| 2003/0080714 A1 | 5/2003 | Inoue et al. | |
| 2003/0211384 A1 | 11/2003 | Hamada et al. | |
| 2004/0066039 A1 * | 4/2004 | Muhammad | F16L 13/143 285/382 |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0062681 A1 | 3/2007 | Beech | |
| 2007/0087266 A1 | 4/2007 | Bourke et al. | |
| 2007/0227166 A1 | 10/2007 | Rafalovich et al. | |
| 2008/0003491 A1 | 1/2008 | Yahnker et al. | |
| 2008/0041079 A1 | 2/2008 | Nishijima et al. | |
| 2008/0110189 A1 | 5/2008 | Alston et al. | |
| 2008/0182151 A1 | 7/2008 | Mizusaki et al. | |
| 2008/0248338 A1 | 10/2008 | Yano et al. | |
| 2008/0314071 A1 | 12/2008 | Ohta et al. | |
| 2009/0074478 A1 | 3/2009 | Kurachi | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0258289 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 * | 12/2009 | Payne | H01M 10/647 429/120 |
| 2009/0325055 A1 * | 12/2009 | Koetting | H01M 10/6556 429/120 |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0052959 A1 | 3/2011 | Koetting et al. | |
| 2012/0082880 A1 | 4/2012 | Koetting et al. | |
| 2013/0192800 A1 * | 8/2013 | Tiberghien | F28F 27/00 165/108 |
| 2013/0255293 A1 | 10/2013 | Gadawski et al. | |
| 2013/0309542 A1 | 11/2013 | Merriman et al. | |
| 2014/0335390 A1 * | 11/2014 | Hwang | F25D 17/02 429/72 |

FOREIGN PATENT DOCUMENTS

| | | |
|---|---|---|
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2002333255 A | 11/2002 |

(56) References Cited

FOREIGN PATENT DOCUMENTS

| | | | | |
|---|---|---|---|---|
| JP | 2003188323 A | 7/2003 | | |
| JP | 2003282112 A | 10/2003 | | |
| JP | 2004333115 A | 11/2004 | | |
| JP | 2005126315 A | 5/2005 | | |
| JP | 2005147443 A | 6/2005 | | |
| JP | 2005349955 A | 12/2005 | | |
| JP | 2006139928 A | 6/2006 | | |
| JP | 2007305425 A | 11/2007 | | |
| JP | 2008054379 A | 3/2008 | | |
| JP | 2008062875 A | 3/2008 | | |
| JP | 2008080995 A | 4/2008 | | |
| JP | 2008159440 A | 7/2008 | | |
| JP | 2009009889 A | 1/2009 | | |
| JP | 2009054297 A | 3/2009 | | |
| KR | 20050092605 A | 9/2005 | | |
| KR | 100637472 B1 | 10/2006 | | |
| KR | 100765659 B1 | 10/2007 | | |
| KR | 20080047641 A | 5/2008 | | |
| KR | 20090082212 A | 7/2009 | | |
| KR | 100921346 B1 | 10/2009 | | |
| KR | 101205180 B1 * | 11/2012 | .......... | H01M 10/625 |
| KR | WO 2013081396 A1 * | 6/2013 | ............. | F25D 17/02 |
| WO | 2006101343 A | 9/2006 | | |
| WO | 2007007503 A | 1/2007 | | |
| WO | 2007115743 A2 | 10/2007 | | |
| WO | 2008111162 A | 9/2008 | | |
| WO | 2009073225 A | 6/2009 | | |

OTHER PUBLICATIONS

"Gasket". Merriam-Webster. Merriam-Webster. Web. May 30, 2012. <http://www.merriam-webster.com/dictionary/gasket>.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: Jan. 31, 2011; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

U.S. Appl. No. 13/586,960, filed Aug. 16, 2012 entitled Battery Module.

U.S. Appl. No. 13/587,030, filed Aug. 16, 2012 entitled Battery Module and Method for Assembling the Battery Module.

U.S. Appl. No. 13/766,162, filed Feb. 13, 2013 entitled Battery Cell Assembly and Method for Manufacturing the Battery Cell Assembly.

U.S. Appl. No. 13/861,426, filed Apr. 12, 2013 entitled Battery Cell Assembly and Method for Manufacturing a Cooling Fin for the Battery Cell Assembly.

U.S. Appl. No. 13/936,556, filed Jul. 8, 2013 entitled Battery Assembly.

U.S. Appl. No. 13/686,018, filed Nov. 27, 2012 entitled Battery System and Method for Cooling a Battery Cell Assembly.

* cited by examiner

BATTERY CELL ASSEMBLY AND METHOD FOR COUPLING A COOLING FIN TO FIRST AND SECOND COOLING MANIFOLDS

BACKGROUND

The inventors herein have recognized a need for an improved battery cell assembly and a method for coupling a cooling fin to cooling manifolds that utilizes a cooling fin with first and second cylindrical coupling members that each provide two fluid-tight seals.

SUMMARY

A battery cell assembly in accordance with an exemplary embodiment is provided. The battery cell assembly includes a cooling fin having a tube, a substantially rectangular-shaped metal plate, first and second cylindrical coupling members, and first, second, third and fourth O-ring gaskets. The tube has an inlet tube portion and an outlet tube portion. The tube is disposed on and coupled to a peripheral region of the substantially rectangular-shaped metal plate. The first cylindrical coupling member has a first aperture extending therethrough, and first and second circumferential grooves extending around the first cylindrical coupling member. The inlet tube portion is disposed in the first aperture and fixedly coupled to the first cylindrical coupling member. The first and second O-ring gaskets are disposed in the first and second circumferential grooves, respectively, such that the first and second O-ring gaskets are removably coupled to the first cylindrical coupling member. The second cylindrical coupling member has a second aperture extending therethrough, and third and fourth circumferential grooves extending around the second cylindrical coupling member. The outlet tube portion is disposed in the second aperture and is fixedly coupled to the second cylindrical coupling member. The third and fourth O-ring gaskets are disposed in the third and fourth circumferential grooves, respectively, such that the third and fourth O-ring gaskets are removably coupled to the second cylindrical coupling member. The first and second battery cells are disposed against first and second sides, respectively, of the cooling fin.

A method for coupling a cooling fin to first and second cooling manifolds in accordance with another exemplary embodiment is provided. The method includes providing a cooling fin having a tube, a substantially rectangular-shaped metal plate, first and second cylindrical coupling members, and first, second, third and fourth O-ring gaskets. The tube has an inlet tube portion and an outlet tube portion. The tube is disposed on and coupled to a peripheral region of the substantially rectangular-shaped metal plate. The first cylindrical coupling member has a first aperture extending therethrough, and first and second circumferential grooves extending around the first cylindrical coupling member. The inlet tube portion is disposed in the first aperture and fixedly coupled to the first cylindrical coupling member. The first and second O-ring gaskets are disposed in the first and second circumferential grooves, respectively, such that the first and second O-ring gaskets are removably coupled to the first cylindrical coupling member. The second cylindrical coupling member has a second aperture extending therethrough, and third and fourth circumferential grooves extending around the second cylindrical coupling member. The outlet tube portion is disposed in the second aperture and fixedly coupled to the second cylindrical coupling member. The third and fourth O-ring gaskets are disposed in the third and fourth circumferential grooves, respectively, such that the third and fourth O-ring gaskets are removably coupled to the second cylindrical coupling member. The method includes disposing the first cylindrical coupling member into an aperture of a port member of the first cooling manifold such that the first and second O-ring gaskets form first and second fluid-tight seals, respectively, with the port member of the first cylindrical coupling member. The method further includes disposing the second cylindrical coupling member into an aperture of a port member of the second cooling manifold such that the third and fourth O-ring gaskets form first and second fluid-tight seals, respectively, with the port member of the second cylindrical coupling member.

DETAILED DESCRIPTION

Figure 1:
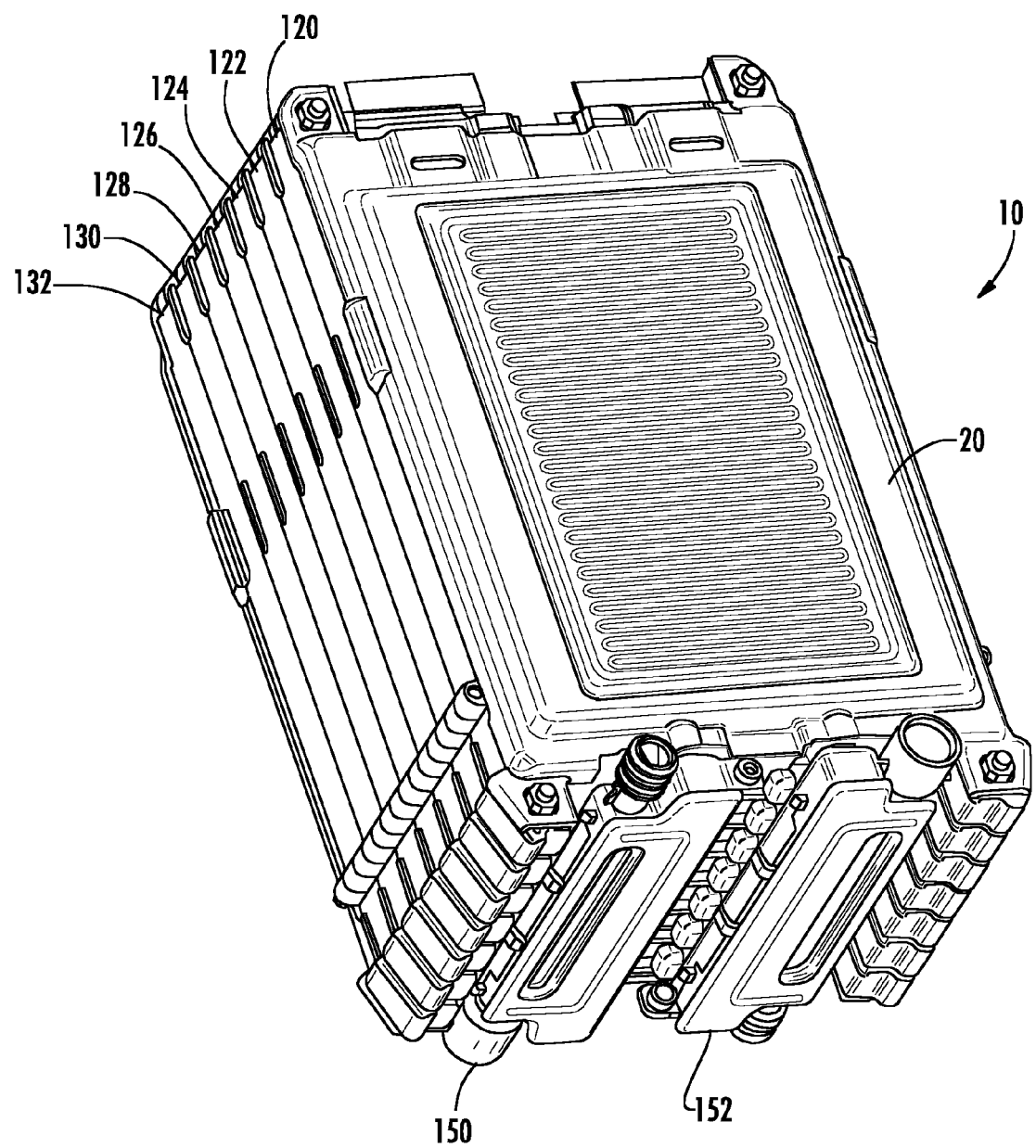
FIG. 1 is a schematic of a battery cell assembly in accordance with an exemplary embodiment.
Figure 2:
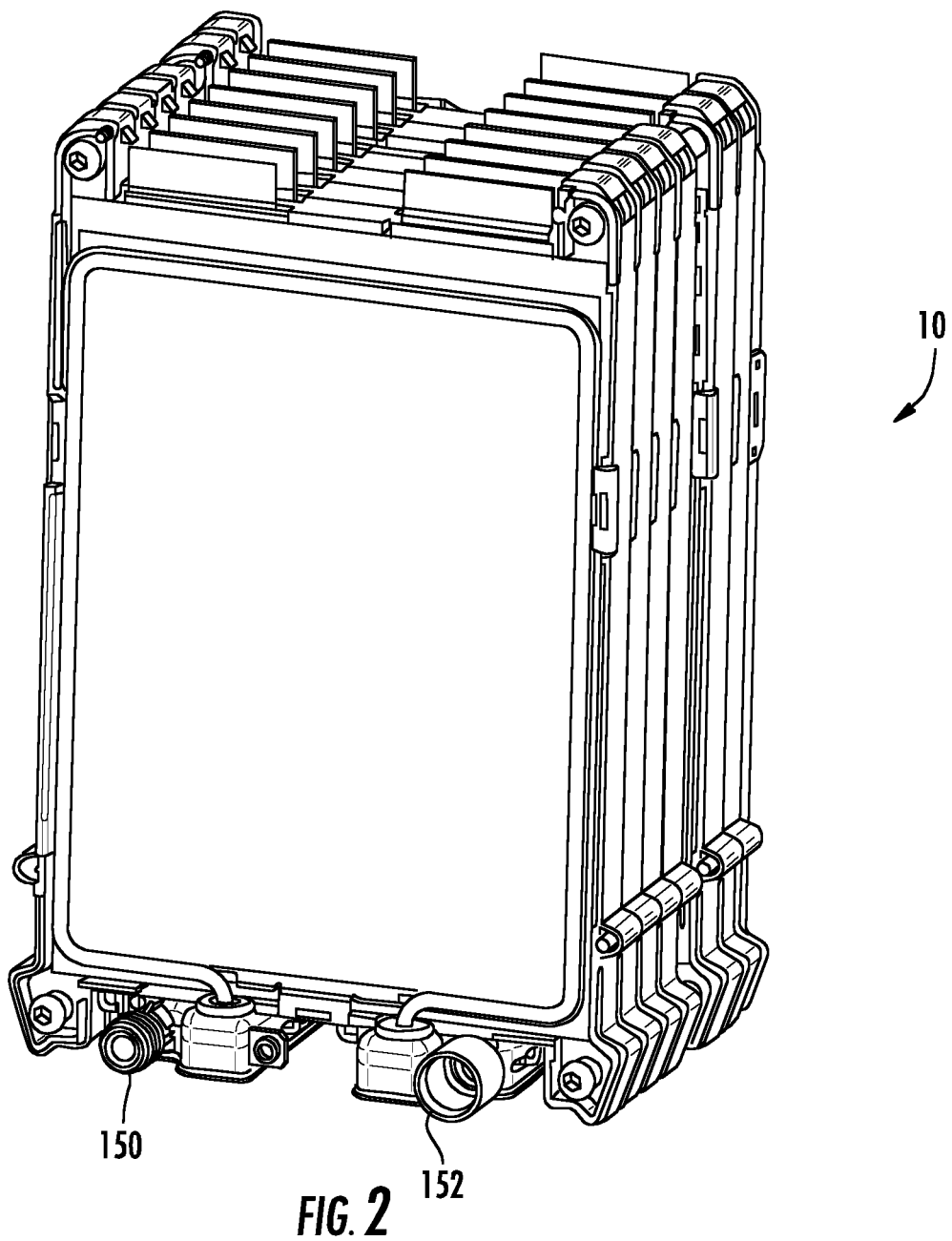
FIG. 2 is a schematic of a portion of the battery cell assembly of FIG. 1.
Figure 3:
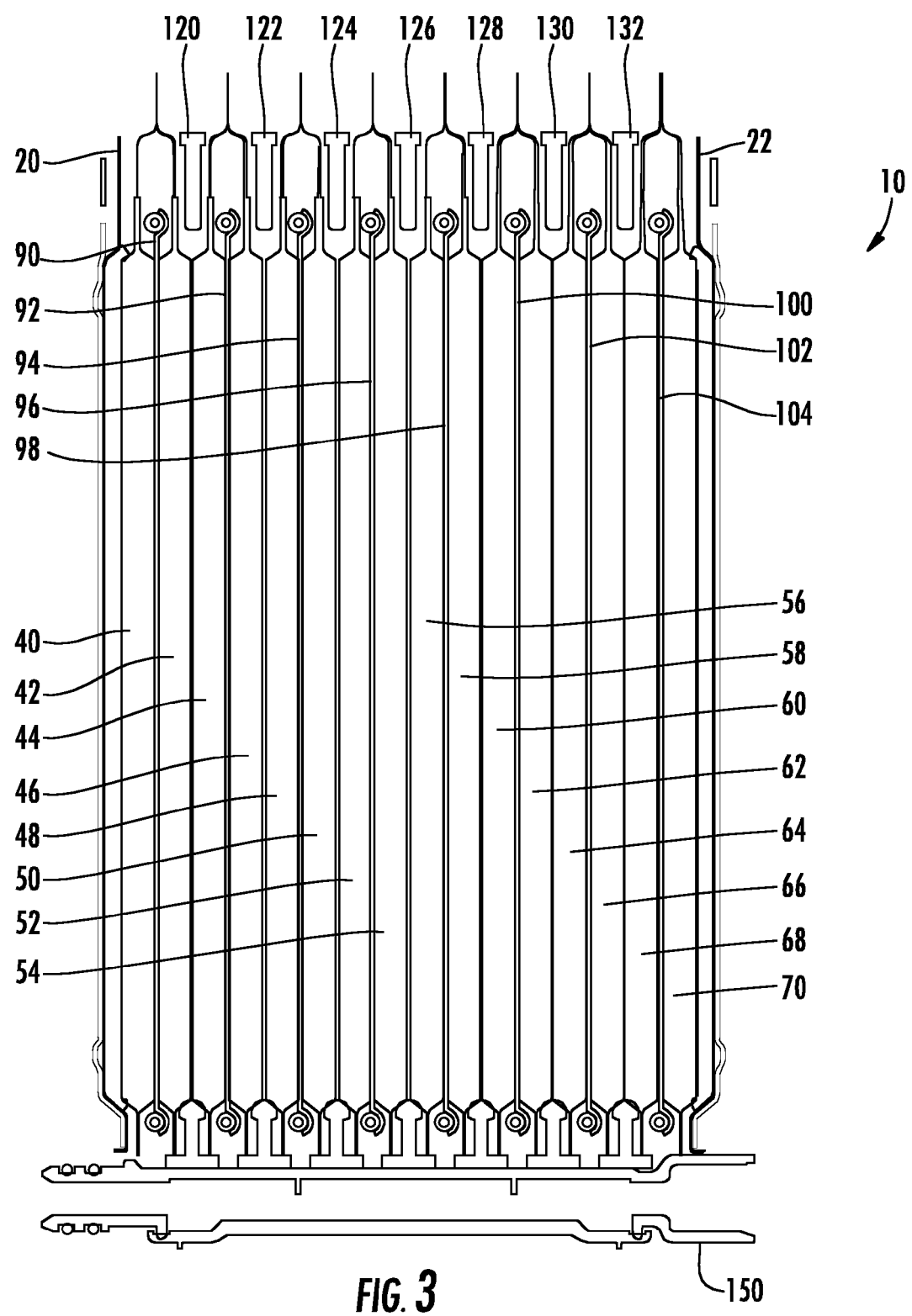
FIG. 3 is a cross-sectional schematic of the battery cell assembly of FIG. 1.
Figure 4:
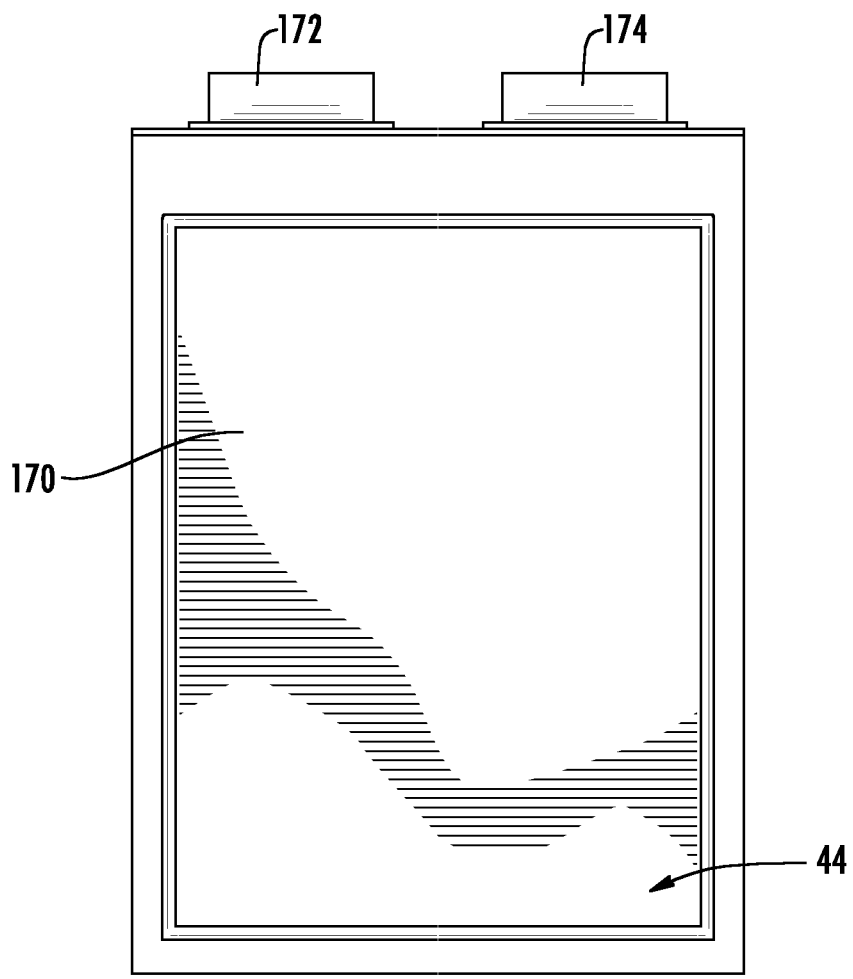
FIG. 4 is a schematic of a battery cell utilized in the battery cell assembly of FIG. 1.

Referring to FIGS. 1-3, a battery cell assembly 10 for generating electrical power in accordance with an exemplary embodiment is illustrated. The battery cell assembly 10 includes end plates 20, 22, battery cells 40, 42, 44, 46, 48, 50, 52, 54, 56, 58, 60, 62, 64, 66, 68, 70, cooling fins 90, 92, 94, 96, 98, 100, 102, 104, frame members 120, 122, 124, 126, 128, 130, 132, and cooling manifolds 150, 152. An advantage of the battery cell assembly 10 is that the assembly 10 utilizes cooling fins each having first and second cylindrical coupling members that fluidly couple to the cooling manifolds 150, 152, respectfully, and form fluid tight seals with the cooling manifolds 150, 152.

The battery cells 40, 42 are disposed on opposite sides of the cooling fin 90 such that the cooling fin 90 cools the battery cells 40, 42. The battery cell 40 is further disposed against the end plate 20, and the battery cell 42 is further disposed against the frame member 120, such that the battery cell 40, the cooling fin 90, and the battery cell 42 are held between the end plate 20 and the frame member 120.

The battery cells 44, 46 are disposed on opposite sides of the cooling fin 92 such that the cooling fin 92 cools the battery cells 44, 46. The battery cell 44 is further disposed against the frame member 120, and the battery cell 46 is further disposed against the frame member 122, such that the battery cell 44, the cooling fin 92, and the battery cell 46 are held between the frame member 120 and the frame member 122.

The battery cells 48, 50 are disposed on opposite sides of the cooling fin 94 such that the cooling fin 94 cools the battery cells 48, 50. The battery cell 48 is further disposed against the frame member 122, and the battery cell 50 is further disposed against the frame member 124, such that the battery cell 48, the cooling fin 94, and the battery cell 50 are held between the frame member 122 and the frame member 124.

The battery cells 52, 54 are disposed on opposite sides of the cooling fin 96 such that the cooling fin 96 cools the battery cells 52, 54. The battery cell 52 is further disposed against the frame member 124, and the battery cell 54 is further disposed against the frame member 126, such that the battery cell 52, the cooling fin 96, and the battery cell 54 are held between the frame member 124 and the frame member 126.

The battery cells 56, 58 are disposed on opposite sides of the cooling fin 98 such that the cooling fin 98 cools the battery cells 56, 58. The battery cell 56 is further disposed against the frame member 126, and the battery cell 58 is further disposed against the frame member 128, such that the battery cell 56, the cooling fin 98, and the battery cell 58 are held between the frame member 126 and the frame member 128.

The battery cells 60, 62 are disposed on opposite sides of the cooling fin 100 such that the cooling fin 100 cools the battery cells 60, 62. The battery cell 60 is further disposed against the frame member 128, and the battery cell 62 is further disposed against the frame member 130, such that the battery cell 60, the cooling fin 100, and the battery cell 62 are held between the frame member 128 and the frame member 130.

The battery cells 64, 66 are disposed on opposite sides of the cooling fin 102 such that the cooling fin 102 cools the battery cells 64, 66. The battery cell 64 is further disposed against the frame member 130, and the battery cell 66 is further disposed against the frame member 132, such that the battery cell 64, the cooling fin 102, and the battery cell 66 are held between the frame member 130 and the frame member 132.

The battery cells 68, 70 are disposed on opposite sides of the cooling fin 104 such that the cooling fin 104 cools the battery cells 68, 70. The battery cell 68 is further disposed against the frame member 132, and the battery cell 70 is further disposed against the end plate 22, such that the battery cell 68, the cooling fin 104, and the battery cell 70 are held between the frame member 132 and the end plate 22.

Figure 12:
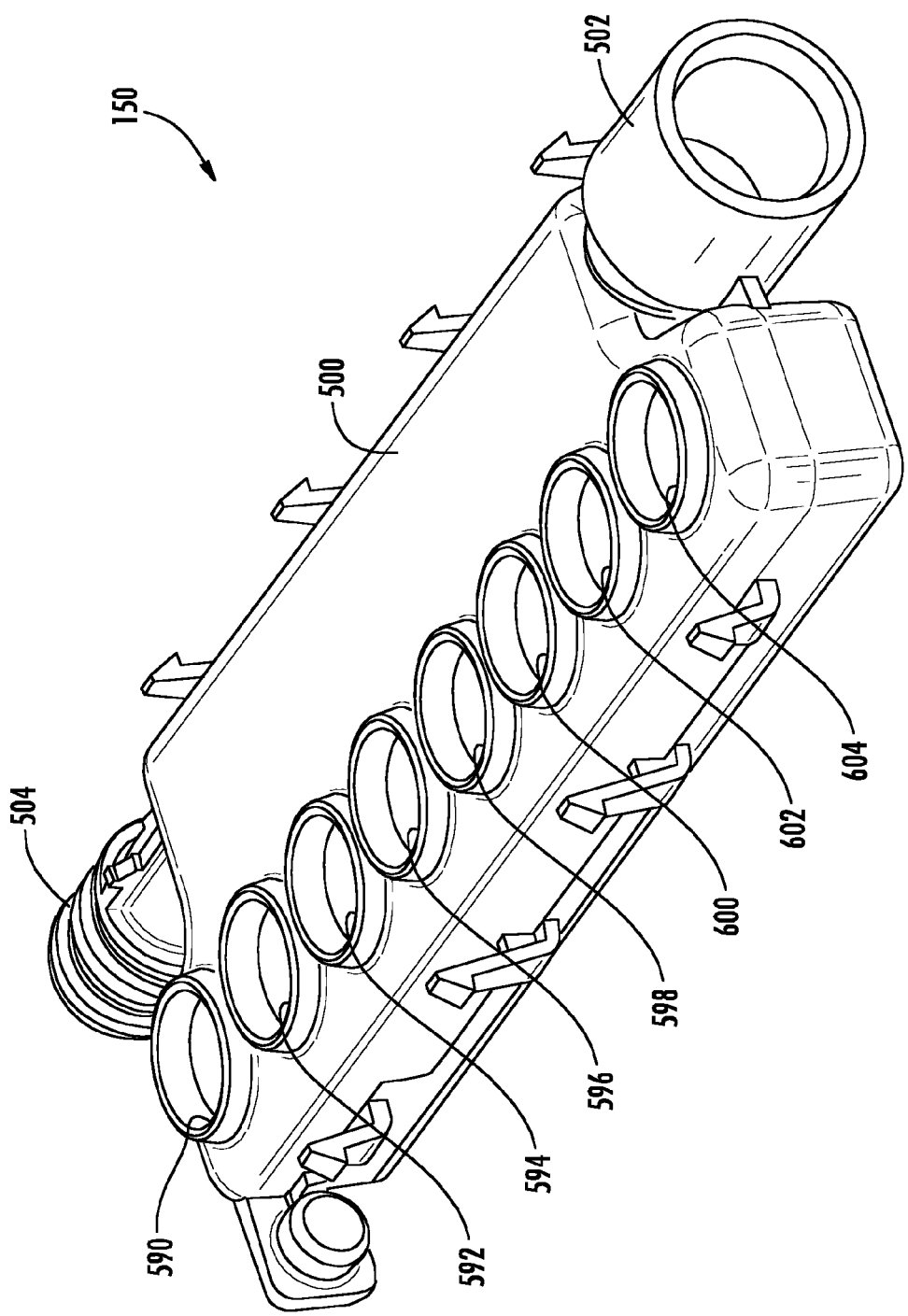
FIG. 12 is a schematic of a first cooling manifold utilized in the battery cell assembly of FIG. 1.
Figure 13:
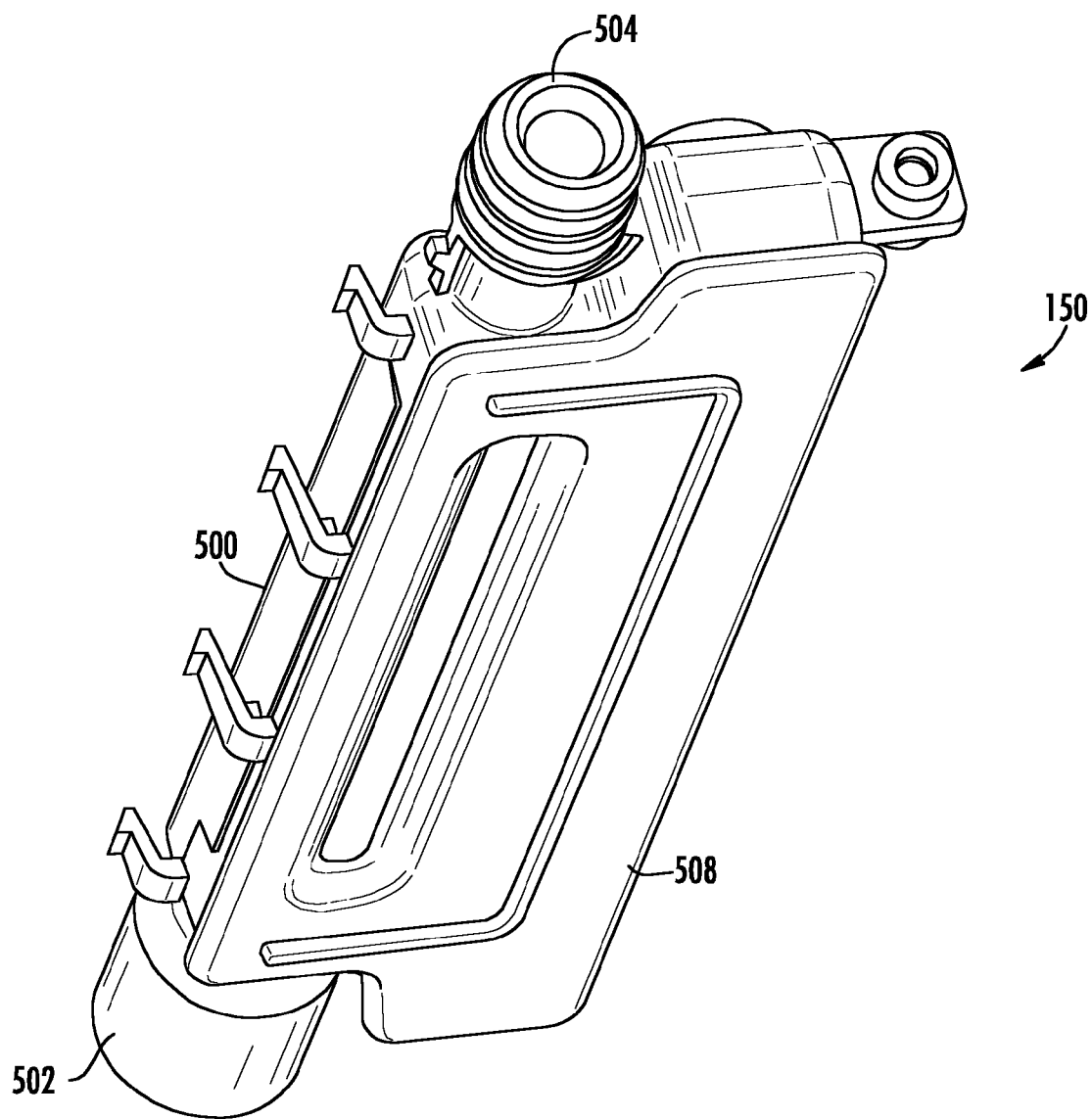
FIG. 13 is another schematic of the first cooling manifold of FIG. 12.
Figure 14:
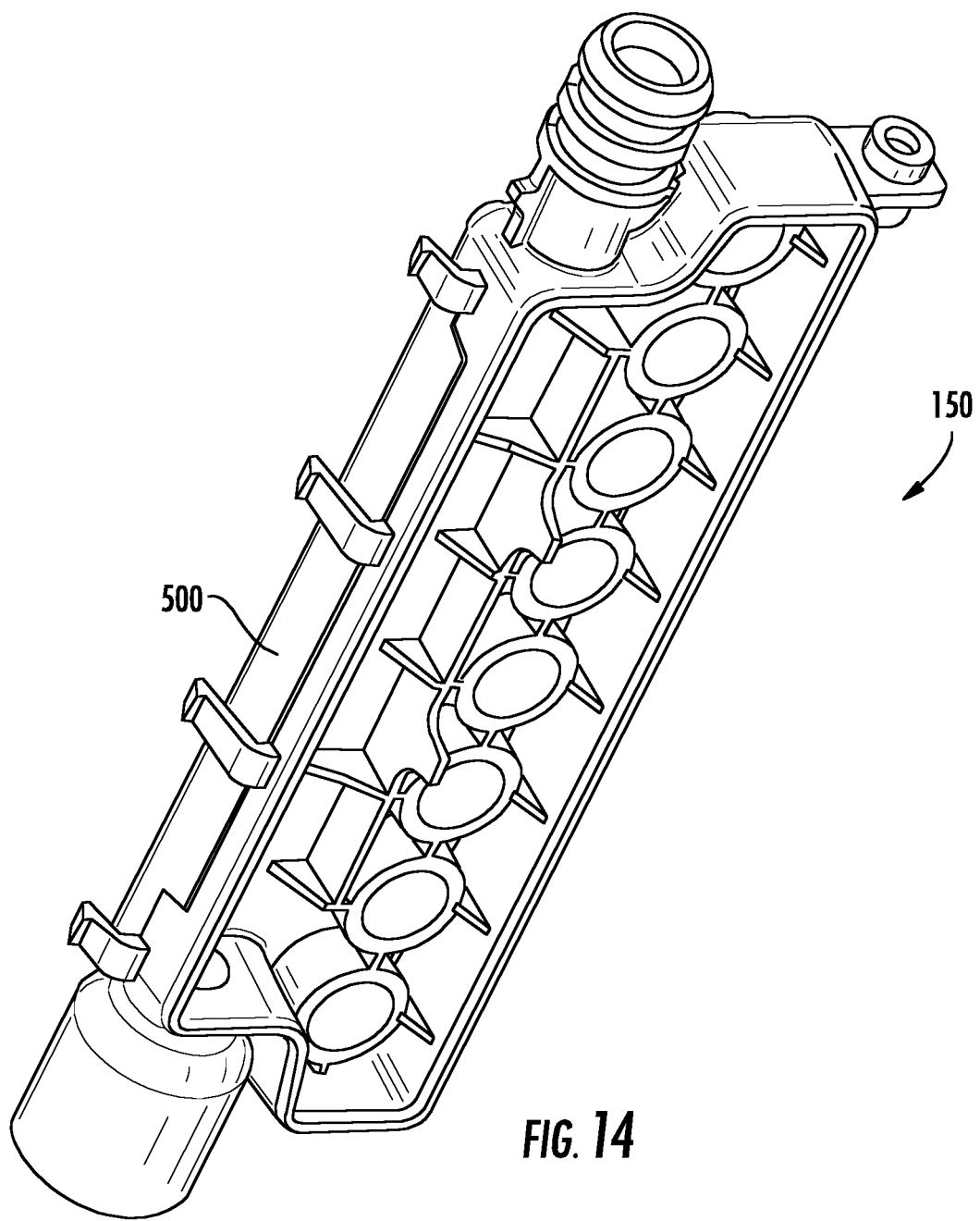
FIG. 14 is a cross-sectional schematic of the first cooling manifold of FIG. 12.
Figure 15:
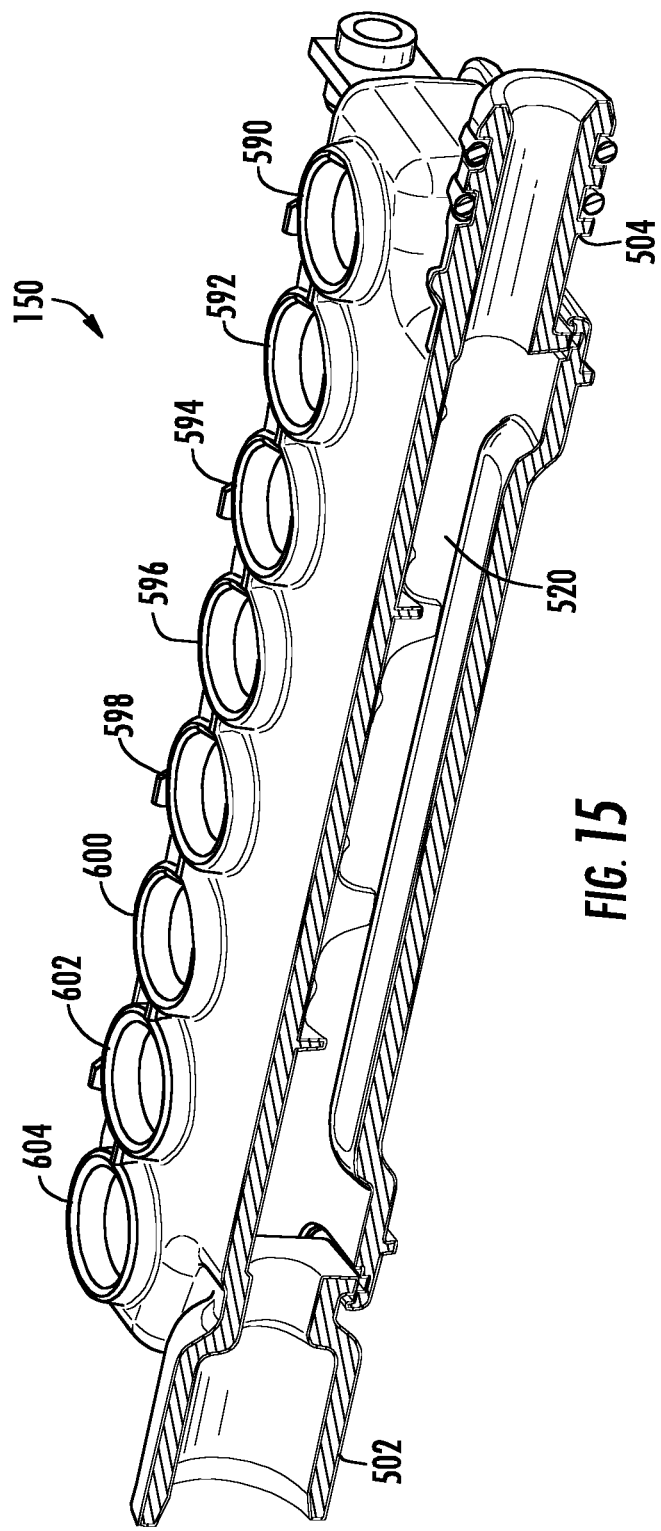
FIG. 15 is another cross-sectional schematic of the first cooling manifold of FIG. 12.

Referring to FIGS. 3 and 12, the battery cells 40-72 are each configured to generate an operational voltage. In an exemplary embodiment, each of the battery cells 40-72 are pouch-type lithium-ion battery cells. Of course, other types of battery cells known to those skilled in the art could be utilized. Also, in an exemplary embodiment, the battery cells 40-72 are electrically coupled in series to one another. Since the battery cells 40-72 have an identical structure with one another, only the battery cell 44 will be described in further detail. The battery cell 44 includes a rectangular-shaped pouch 170 and electrodes 172, 174 extending from a first end of the pouch 170.

Referring to FIGS. 3 and 5-7, the cooling fins 90-104 are fluidly coupled to the cooling manifolds 150, 152. The cooling fins 90-104 have an identical structure with one another. Accordingly, only the structure of the cooling fin 92 will be discussed in greater detail below. In an exemplary embodiment, the cooling fin 92 is provided to transfer heat energy from the battery cells 44, 46 to either a two-phase refrigerant or a coolant flowing through the cooling fin 92. If a two-phase refrigerant is utilized, the cooling fin 92 transitions the two-phase refrigerant into a gaseous refrigerant within the cooling fin 92 to cool the battery cells 44, 46. The cooling fin 92 includes a substantially rectangular-shaped metal plate 190, cylindrical coupling members 198, 200, O-ring gaskets 204, 206, 208, 210, and brackets 220, 222, and 224.

The substantially rectangular-shaped metal plate 190 includes a first side 240, a second side 242, first, second, third, and fourth peripheral edge portions 250, 252, 254, 256. The first, second, third, and fourth peripheral edge portions 250, 252, 254, 256 define a peripheral region of the metal plate 190 having an arcuate-shaped groove for receiving a portion of the tube 194 thereon. The first side 240 is sized to cover substantially all of a generally rectangular-shaped side surface of the battery cell 44. The second side 242 is sized to cover substantially all of a generally rectangular-shaped side surface of the battery cell 46.

Figure 6:
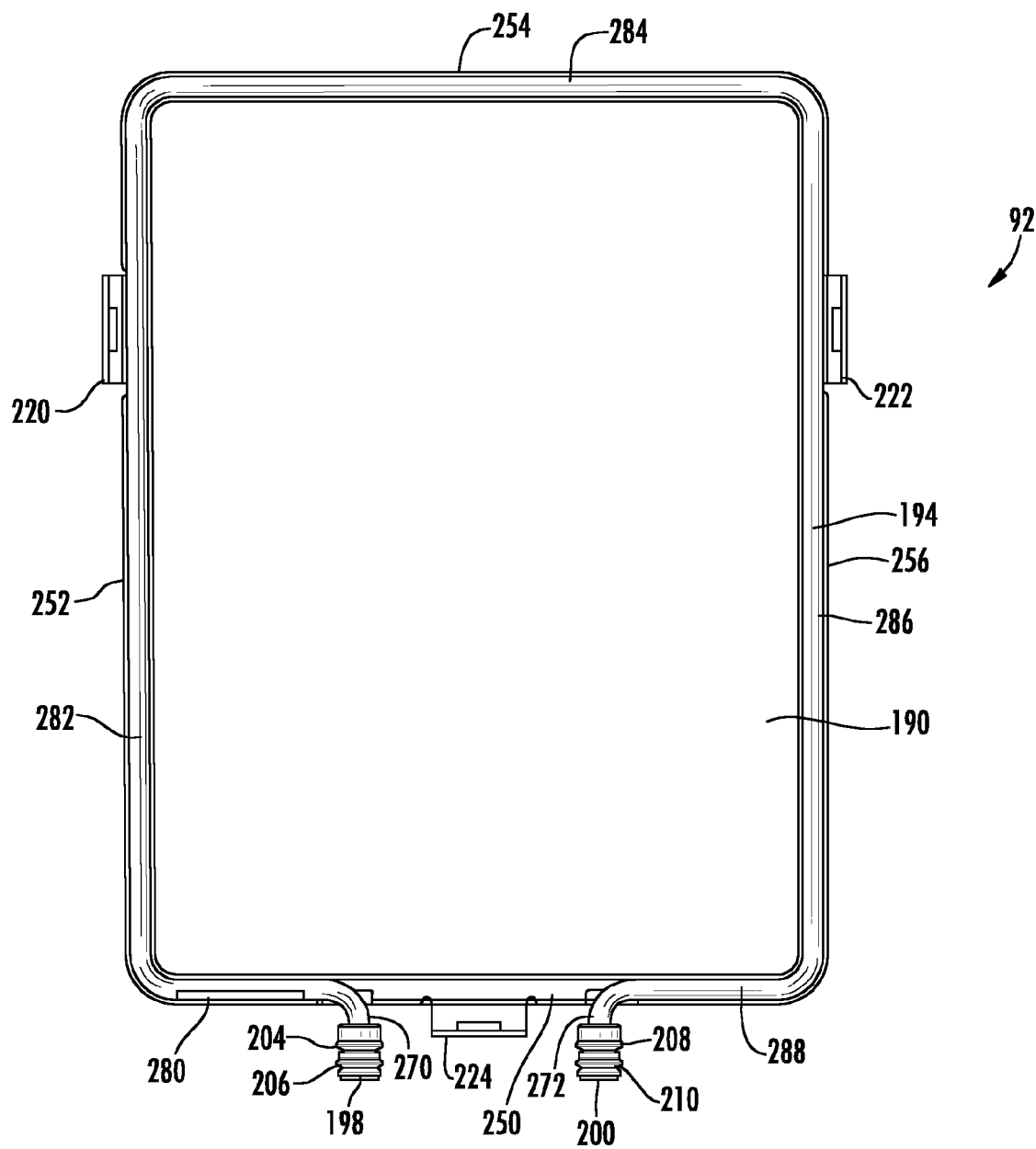
FIG. 6 is a schematic of the cooling fin of FIG. 5.
Figure 7:
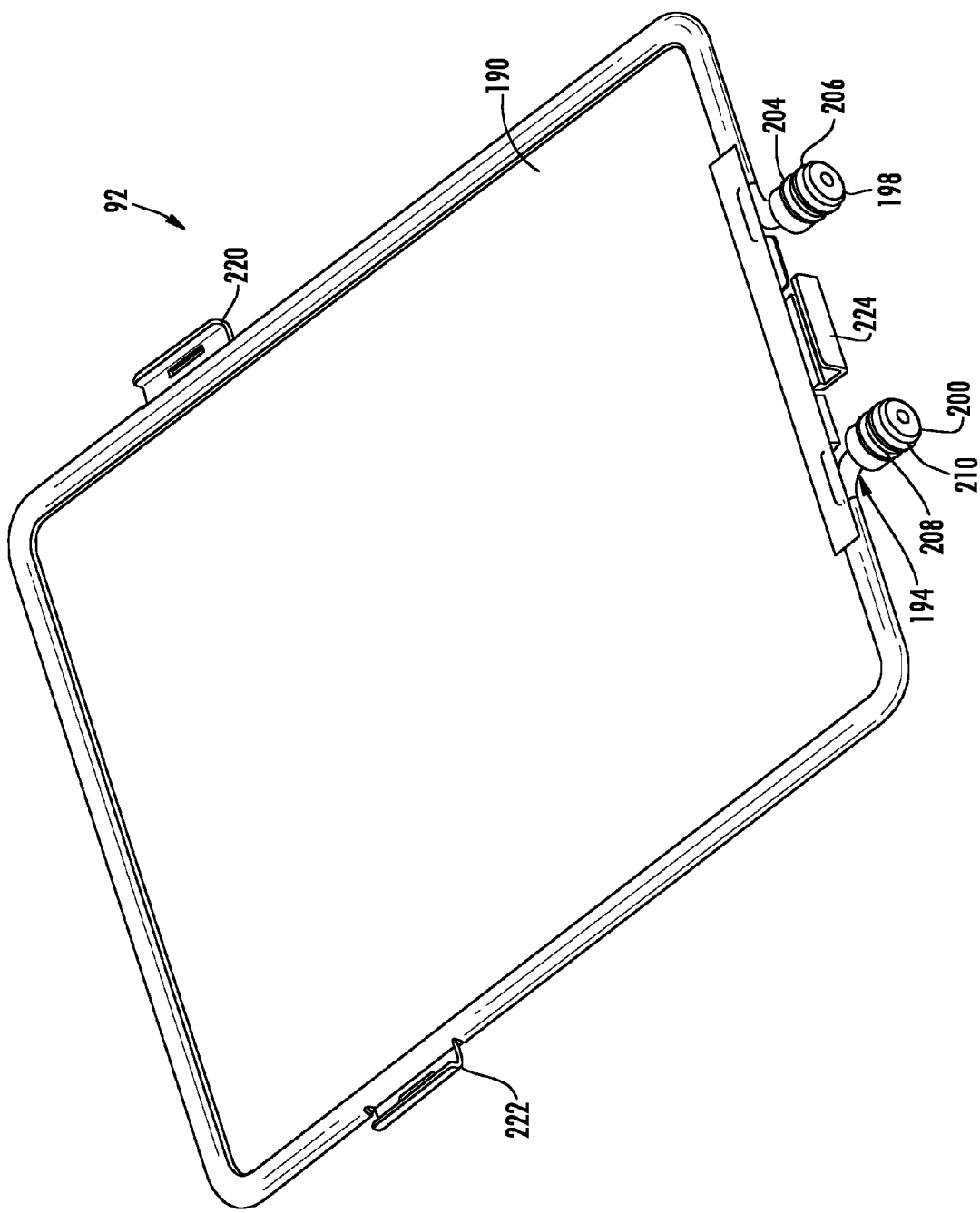
FIG. 7 is another schematic of the cooling fin of FIG. 6.
Figure 8:
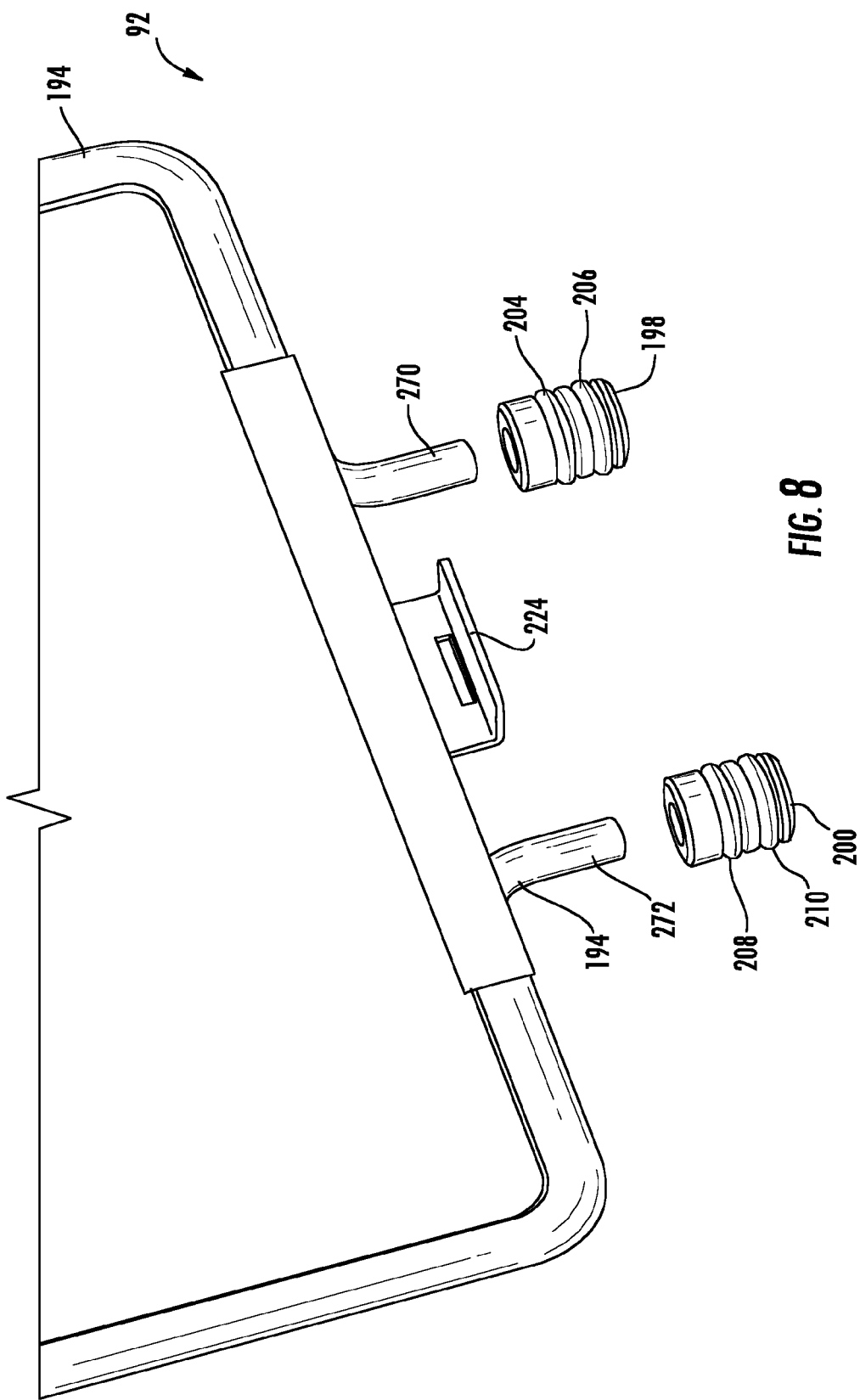
FIG. 8 is an enlarged exploded view of a portion of the cooling fin of FIG. 7.
Figure 9:
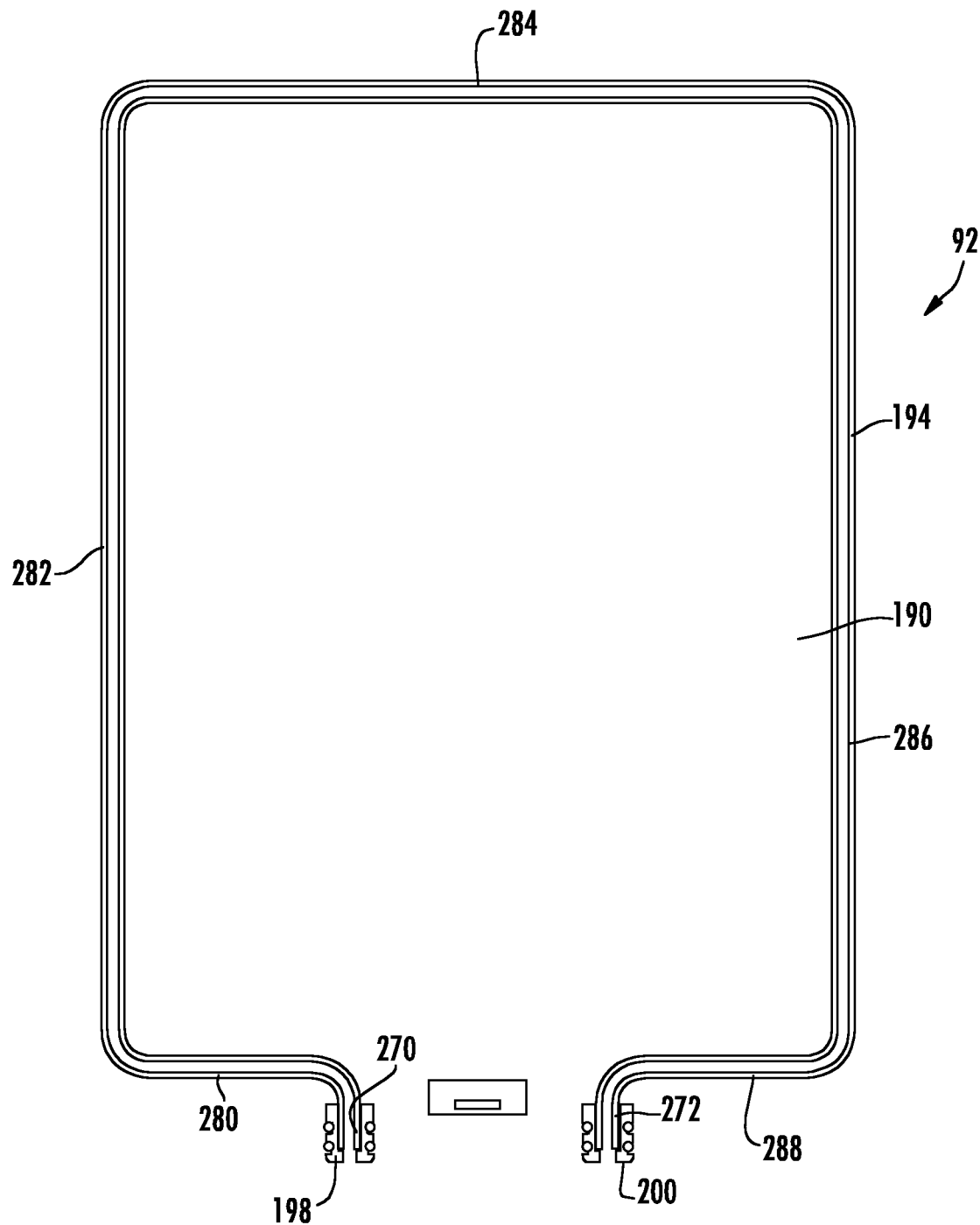
FIG. 9 is a cross-sectional schematic of the cooling fin of FIG. 6.

Referring to FIGS. 6, 8 and 9, the tube 194 is coupled to the first side 240 of the substantially rectangular-shaped metal plate 190, and is coupled to and extends on the first, second, third, and fourth peripheral edge portions 250, 252, 254, 256 of the plate 190. In one exemplary embodiment, the tube 194 is constructed of aluminum. However, the tube 194 could be constructed of other materials known to those skilled in the art. The tube 194 includes an inlet tube portion 270, an outlet tube portion 272, and tube portions 280, 282, 284, 286, 288.

The inlet tube portion 270 and the outlet tube portion 272 extend substantially parallel to one another in a first direction, and extend outwardly from a first end of the substantially rectangular-shaped metal plate 190. Further, the inlet tube portion 270 is coupled to the tube portion 280 which is further coupled to the tube portion 282. Also, the tube portion 282 is coupled to the tube portion 284 which is further coupled to the tube portion 286. Finally, the tube portion 286 is coupled to the tube portion 288 which is further coupled to the outlet tube portion 272.

The tube portion 280 is coupled to the first peripheral edge portion 250, and the tube portion 282 is coupled to the second peripheral edge portion 252, via brazing for example. The tube portion 284 is coupled to the third peripheral edge portion 254, and the tube portion 286 is coupled to the fourth peripheral edge portion 256, via brazing for example. Also, the tube portion 288 is coupled to the first peripheral edge portion 250, via brazing for example.

Figure 10:
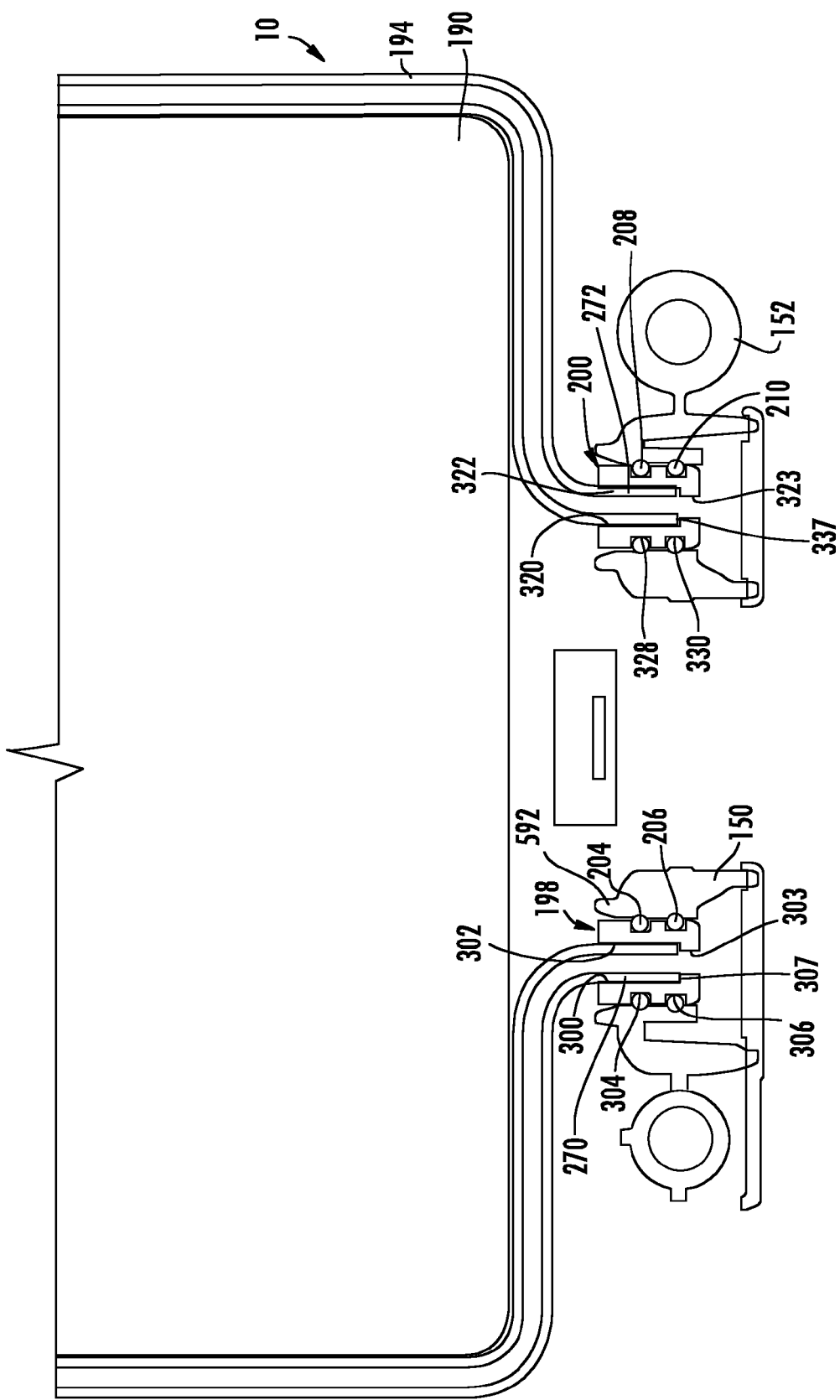
FIG. 10 is an enlarged cross-sectional schematic of a portion of the battery cell assembly of FIG. 5.

Referring to FIGS. 8 and 10, the cylindrical coupling member 198 has an aperture 300 extending therethrough, and circumferential grooves 304, 306 extending around and into the cylindrical coupling member 198. In an exemplary embodiment, the cylindrical coupling member 198 is constructed of aluminum. However, in an alternative embodiment, the cylindrical coupling member 198 could be constructed of other materials such as steel, copper, or plastic for example. The inlet tube portion 270 is disposed in the aperture 300 and is fixedly coupled to the cylindrical coupling member 198, via brazing for example. In particular, the aperture 300 includes aperture portions 302, 303. The aperture portion 302 has a diameter substantially equal to an outer diameter of the inlet tube portion 270 such that the inlet tube portion 270 is received within the aperture portion 302. The aperture portion 303 has a diameter less than the outer diameter of the inlet tube portion 270, and defines a ledge 307 on which an end of the inlet tube portion 270 is disposed thereon. Accordingly, the inlet tube portion 270 extends through a portion of the cylindrical coupling member 198 but does not extend completely through the cylindrical coupling member 198. The O-ring gaskets 204, 206 are disposed in the circumferential grooves 304, 306, respectively, such that the O-ring gaskets 204, 206 are removably coupled to the cylindrical coupling member 198. In one exemplary embodiment, the O-ring gaskets 204, 206 are constructed of an elastomeric material, such as a rubber compound for example. The cylindrical coupling member 198 is fluidly and removably coupled to a port member 592 (shown in FIG. 12) of the cooling manifold 150 such that the O-ring gaskets 204, 206 form first and second fluid-tight seals, respectively with the port member 592.

The cylindrical coupling member 200 has an aperture 320 extending therethrough, and circumferential grooves 328, 330 extending around and into the cylindrical coupling member 200. In an exemplary embodiment, the cylindrical coupling member 200 is constructed of aluminum. However, in an alternative embodiment, the cylindrical coupling member 200 could be constructed of other materials such as steel, copper, or plastic for example. The outlet tube portion 272 is disposed in the aperture 320 and is fixedly coupled to the cylindrical coupling member 200, via brazing for example. In particular, the aperture 320 includes aperture portions 322, 323. The aperture portion 322 has a diameter substantially equal to an outer diameter of the outlet tube portion 272 such that the outlet tube portion 272 is received within the aperture portion 322. The aperture portion 323 has a diameter less than the outer diameter of the outlet tube portion 272 and defines a ledge 337 on which an end of the outlet tube portion 272 is disposed thereon. Accordingly, the outlet tube portion 272 extends through a portion of the cylindrical coupling member 200 but does not extend completely through the cylindrical coupling member 200. The O-ring gaskets 208, 210 are disposed in the circumferential grooves 328, 330, respectively, such that the O-ring gaskets 208, 210 are removably coupled to the cylindrical coupling member 200. In one exemplary embodiment, the O-ring gaskets 208, 210 are constructed of an elastomeric material, such as a rubber compound for example. The cylindrical coupling member 200 is fluidly and removably coupled to a port member 802 (shown in FIG. 16) of the cooling manifold 152 such that the O-ring gaskets 208, 210 form first and second fluid-tight seals, respectively with the port member 802.

Figure 11:
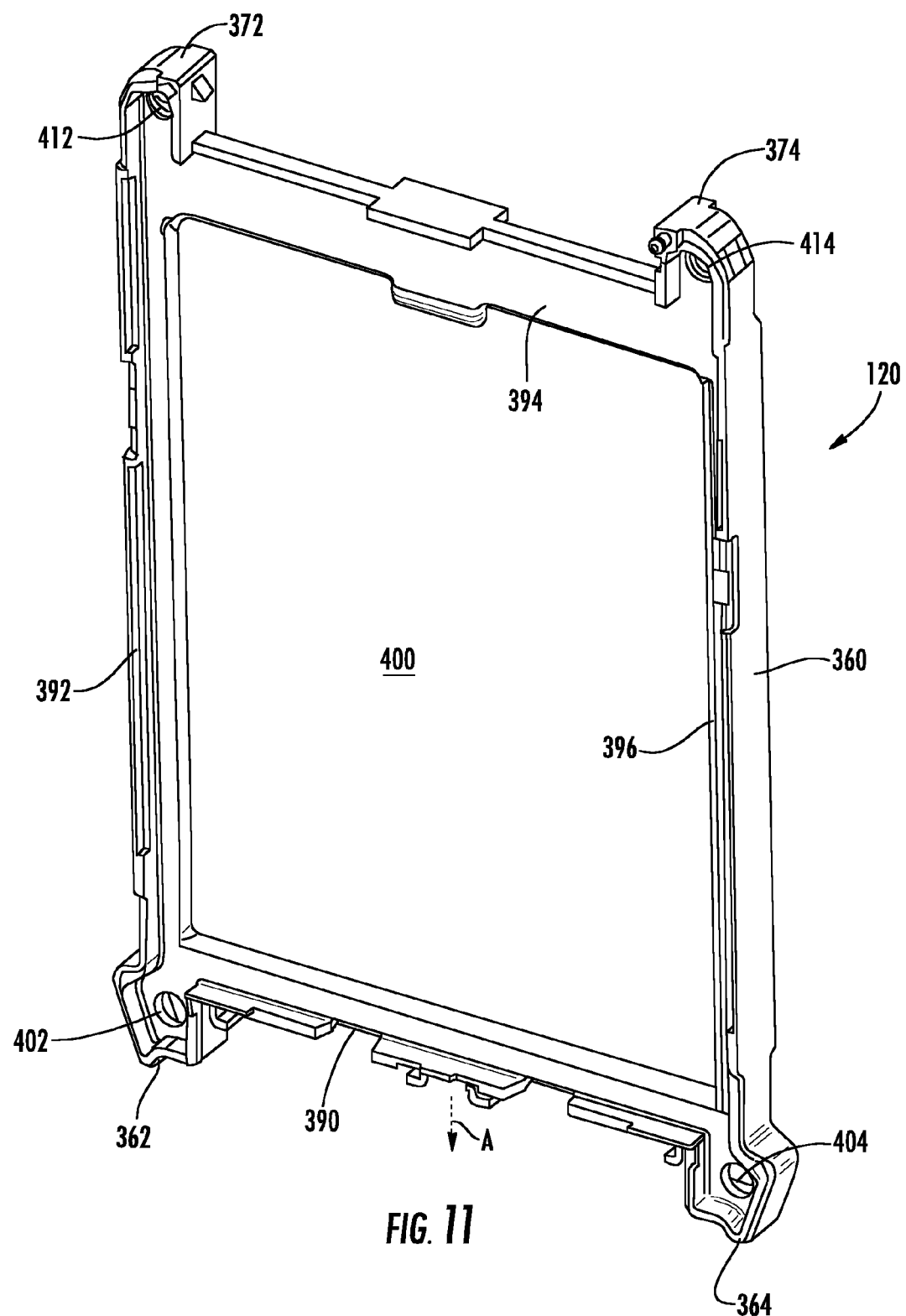
FIG. 11 is a schematic of a frame member utilized in the battery cell assembly of FIG. 1.

Referring to FIGS. 1 and 11, the frame members 120-132 are configured to be coupled together to hold the battery cells 40-72 and the cooling fins 90-104 in predetermined positions. The structure of the frame members 120-132 are identical to one another and therefore only the structure of the frame member 120 will be discussed in greater detail below. In an exemplary embodiment, the frame member 120 is constructed of plastic. However, in an alternative embodiment, the frame member 120 could be constructed of other materials known to those skilled in the art.

The frame member 120 includes a rectangular ring-shaped frame portion 360, leg portions 362, 364 extension portions 372, 374. The rectangular ring-shaped portion 360 includes walls 390, 392, 394, 396 defining an open region 400. The walls 390, 394 are disposed substantially parallel to one another. Further, the walls 392, 396 are disposed substantially parallel to one another and are coupled to the walls 390, 394.

Referring to FIGS. 1 and 11, the leg portions 362, 364 extend outwardly from the wall 390 in a first direction. The leg portions 362, 364 include apertures 402, 404, respectively, extending therethrough for receiving respective mounting bolts therethrough. The cooling manifolds 150, 152 are disposed between the leg portions 362, 364. A height of the cooling manifold 150 in the first direction (shown by arrow Λ in FIG. 11) is less than or equal to a height of each of the leg portions 362, 364. Further, a height of the cooling manifold 152 in the first direction is less than or equal to a height of each of the leg portions 362, 364.

The extension portions 372, 374 extend outwardly from the wall 394 in a second direction, opposite to the first direction. The extension portions 372, 374 include apertures 412, 414, respectively, extending therethrough for receiving respective mounting bolts therethrough.

Referring to FIGS. 3 and 12-15, the cooling manifold 150 is provided to transfer either a coolant or a refrigerant to the tubes of the cooling fins 90-104. The cooling manifold 150 includes a housing portion 500, an inlet tubular member 502, an outlet tubular member 504, and a plate 508. In an exemplary embodiment, the cooling manifold 150 is constructed of plastic. However, in an alternative embodiment, the cooling manifold 150 could be constructed of other materials such as steel, aluminum, or copper for example.

The housing portion 500 defines a central flow path 520 (shown in FIG. 13) extending therethrough. The housing portion 500 has the inlet tubular member 502 and the outlet tubular member 504 disposed on opposite ends of the housing portion 500. The inlet tubular member 502 and the outlet tubular member 504 fluidly communicate with the central flow path 520.

The housing portion 500 defines a central open region 510 (shown in FIG. 5) that fluidly communicates with the central flow path 520. The housing portion 500 includes port members 590, 592, 594, 596, 598, 600, 602, 604 each having internal apertures which fluidly communicate with the central open region 510. The port members 590-604 are each configured to receive one cylindrical coupling member of the cooling fins 90-104, respectively, therein to form fluid-tight seals with the respective cylindrical coupling member.

Figure 5:
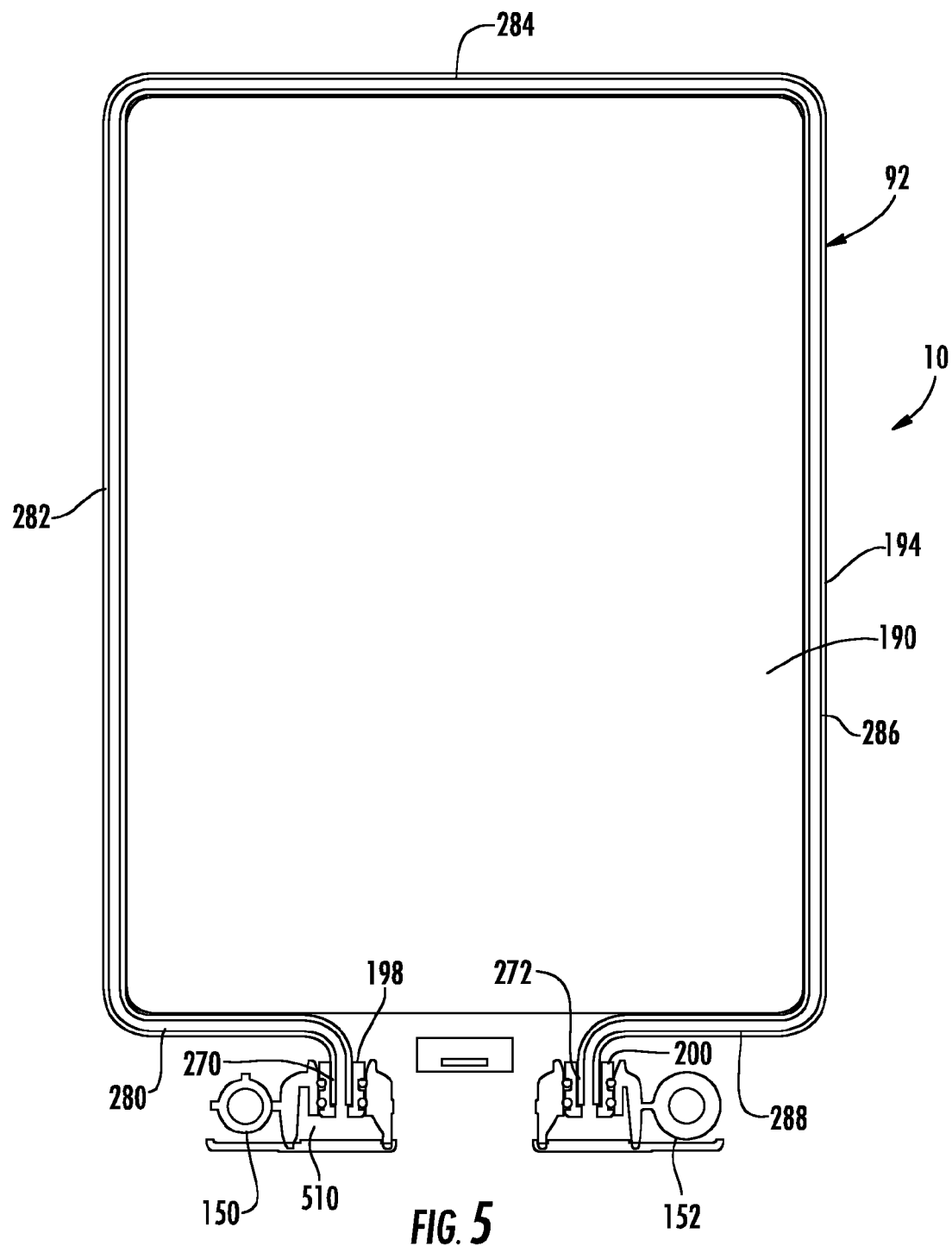
FIG. 5 is a cross-sectional schematic of a portion of the battery cell assembly of FIG. 1 illustrating a cooling fin coupled to first and second cooling manifolds.

The plate 508 is configured and sized to cover an open region of the housing portion 500 to enclose the central flow path 520 (shown in FIG. 15) and the central open region 510 (shown in FIG. 5).

During operation, a fluid or a refrigerant flows through the inlet tubular member 502 and enters the central flow path 520 and then flows through the central open region 510 and through the apertures in the port members 590-604 into the tubes of the cooling fins 90-104.

It is noted that the cooling manifold 150 can be physically and fluidly coupled in series with another cooling manifold having an identical configuration as the cooling manifold 150. In particular, the outlet tubular member 504 can be coupled to an inlet tubular member of another cooling manifold. Further, the inlet tubular member 502 can be coupled to an outlet tubular member of another cooling manifold.

Figure 16:
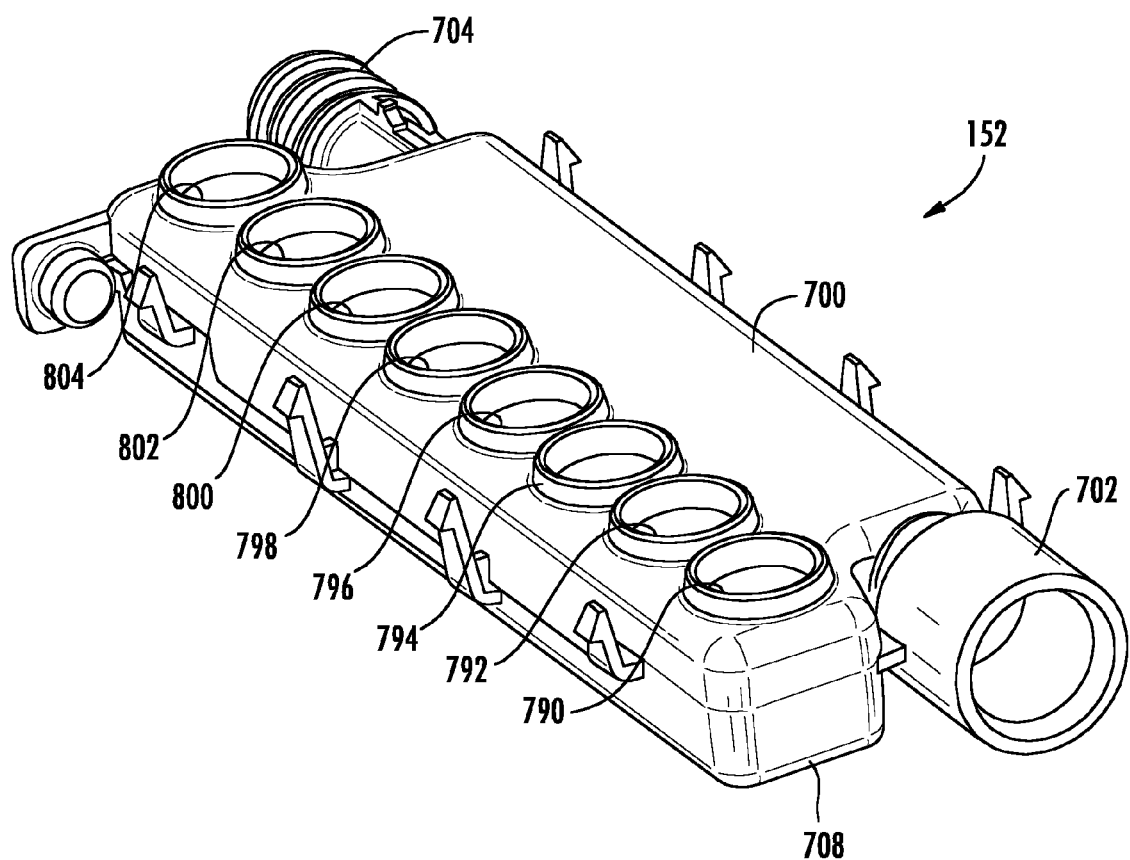
FIG. 16 is a schematic of a second cooling manifold utilized in the battery cell assembly of FIG. 1.

Referring to FIGS. 3 and 16, the cooling manifold 152 is provided to receive either a coolant or a refrigerant from the tubes of the cooling fins 90-104. The cooling manifold 152 includes a housing portion 700, an inlet tubular member 702, an outlet tubular member 704, and a plate 708. In an exemplary embodiment, the cooling manifold 152 is constructed of plastic. However, in an alternative embodiment, the cooling manifold 152 could be constructed of other materials such as steel, aluminum, or copper for example. The cooling manifold 152 has an identical structure as the cooling manifold 150 described above.

The housing portion 700 defines a central flow path extending therethrough. The housing portion 700 has the inlet tubular member 702 and the outlet tubular member 704 disposed on opposite ends of the housing portion 700. The inlet tubular member 702 and the outlet tubular member 704 fluidly communicate with the central flow path of the housing portion 700.

The housing portion 700 defines a central open region that fluidly communicates with the central flow path of the housing portion 700. The housing portion 700 includes port members 790, 792, 794, 796, 798, 800, 802, 804 each having internal apertures which fluidly communicate with the central open region of the housing portion 700. The port members 790-804 are each configured to receive one cylindrical coupling member of the cooling fins 90-104, respectively, therein to form fluid-tight seals with the respective cylindrical coupling member.

The plate 708 is configured and sized to cover an open region of the housing portion 700 to enclose the central flow path and the central open region of the housing portion 700.

During operation, a fluid or a refrigerant flows from the tubes of the cooling fins 90-104 through the apertures in the port members 590-604 into the central open region of the housing portion 700 and then flows through the central flow path of the housing portion 700 and through the outlet tubular member 704.

It is noted that the cooling manifold 152 can be physically and fluidly coupled in series with another cooling manifold having an identical configuration as the cooling manifold 152. In particular, the outlet tubular member 704 can be coupled to an inlet tubular member of another cooling manifold. Further, the inlet tubular member 702 can be coupled to an outlet tubular member of another cooling manifold.

The battery cell assembly 10 and the method for coupling a cooling fin to first and second cooling manifolds provide a substantial advantage over other battery cell assemblies and methods. In particular, the battery cell assembly 10 and the method provide a technical effect of utilizing cooling fins each having first and second cylindrical coupling members with prospective O-ring gaskets to fluidly couple the cooling fins to first and second cooling manifolds.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a cooling fin having a tube, a substantially rectangular-shaped metal plate, first and second cylindrical aluminum coupling members, and first, second, third and fourth O-ring gaskets;
the tube having an inlet tube portion and an outlet tube portion, the tube being disposed on and coupled to a peripheral region of the substantially rectangular-shaped metal plate;
the first cylindrical aluminum coupling member having a first aperture extending therethrough that defines an interior surface of the first cylindrical aluminum coupling member, the first cylindrical aluminum coupling member further having first and second circumferential grooves extending around the first cylindrical aluminum coupling member; the inlet tube portion being disposed in the first aperture such that an exterior surface of the inlet tube portion directly contacts the interior surface of the first cylindrical aluminum coupling member, and inlet tube fixedly coupled to the first cylindrical aluminum coupling member; the first and second O-ring gaskets being disposed in the first and second circumferential grooves, respectively, such that the first and second O-ring gaskets are removably coupled to the first cylindrical aluminum coupling member and are spaced apart from one another a first distance;
the second cylindrical aluminum coupling member having a second aperture extending therethrough that defines an interior surface of the second cylindrical aluminum coupling member, the second cylindrical aluminum coupling member further having third and fourth circumferential grooves extending around the second cylindrical aluminum coupling member; the outlet tube portion being disposed in the second aperture such that an exterior surface of the outlet tube portion directly contacts the interior surface of the second cylindrical aluminum coupling member, and the outlet tube portion being fixedly coupled to the second cylindrical aluminum coupling member; the third and fourth O-ring gaskets being disposed in the third and fourth circumferential grooves, respectively, such that the third and fourth O-ring gaskets are removably coupled to the second cylindrical aluminum coupling member and being spaced apart from one another a second distance;
first and second battery cells being disposed against first and second sides, respectively, of the cooling fin; and
a first cooling manifold having a first housing portion, a first inlet member, a second outlet member, and a first port member, the first housing portion defining a first interior region, the first port member extending upwardly from a top surface of the first housing portion, the first port member fluidly communicating with the first interior region, the first inlet member and the first outlet member fluidly communicating with the first interior region, the first cylindrical aluminum coupling member being fluidly and removably coupled to the first port member such that the first and second O-ring gaskets form first and second fluid-tight seals, respectively, with an interior surface of the first port member.

2. The battery cell assembly of claim 1, wherein the inlet tube portion and the outlet tube portion extending substantially parallel to one another, and the inlet tube portion and the outlet tube portion both extending in substantially a first direction.

3. The battery cell assembly of claim 1, wherein the peripheral region of the substantially rectangular-shaped metal plate includes at least first, second, and third peripheral edge portions, the substantially rectangular-shaped metal plate has a first side and a second side, at least a portion of the tube being coupled to the first side and being disposed on the first, second, and third peripheral edge portions, the tube defining an internal flow path therein.

4. The battery cell assembly of claim 3, wherein the substantially rectangular-shaped metal plate is constructed of aluminum and the tube is constructed of aluminum.

5. The battery cell assembly of claim 3, wherein the substantially rectangular-shaped metal plate is sized to cover substantially all of a substantially rectangular-shaped side surface of the first battery cell.

6. The battery cell assembly of claim 1, further comprising first and second frame members being coupled together, the cooling fin and the first and second battery cells being disposed between the first and second frame members.

7. The battery cell assembly of claim 6, wherein:
the first frame member having a first frame portion and first and second leg portions extending from an end of the first frame portion in a first direction; and
the second frame member having a second frame portion and third and fourth leg portions extending from an end of the second frame portion in the first direction.

8. The battery cell assembly of claim 7, wherein the first cooling manifold is disposed between the first and second leg portions of the first frame member, and a height of the first cooling manifold in the first direction is less than or equal to a height of each of the first and second leg portions in the first direction.

9. A method for coupling a cooling fin to first and second cooling manifolds, comprising:
providing a cooling fin having a tube, a substantially rectangular-shaped metal plate, first and second cylindrical metal coupling members, and first, second, third and fourth O-ring gaskets; the tube having an inlet tube portion and an outlet tube portion, the tube being disposed on and coupled to a peripheral region of the substantially rectangular-shaped metal plate; the first cylindrical metal coupling member having a first aperture extending therethrough that defines an interior surface of the first cylindrical metal coupling member, the first cylindrical metal coupling member having first and second circumferential grooves extending around the first cylindrical metal coupling member; the inlet tube portion being disposed in the first aperture such that an exterior surface of the inlet tube portion directly contacts the interior surface of the first cylindrical metal coupling member, and the inlet tube portion being fixedly coupled to the first cylindrical metal coupling member; the first and second O-ring gaskets being disposed in the first and second circumferential grooves, respectively, such that the first and second O-ring gaskets are removably coupled to the first cylindrical metal coupling member; the first O-ring gasket having a wall with a substantially circular-shaped cross-sectional profile, and a depth of the first groove of the first cylindrical aluminum coupling member being greater than a radius of the circular-shaped cross-sectional profile of the wall of the first O-ring gasket; the second cylindrical metal coupling member having a second aperture extending therethrough that defines an interior surface of the second cylindrical metal coupling member, and the second cylindrical metal coupling member further having third and fourth circumferential grooves extending around the second cylindrical metal coupling member; the outlet tube portion being disposed in the second aperture such that an exterior surface of the outlet tube portion directly contacts the interior surface of the second cylindrical metal coupling member, and the outlet tube portion being fixedly coupled to the second cylindrical metal coupling member; the third and fourth O-ring gaskets being disposed in the third and fourth circumferential grooves, respectively, such that the third and fourth O-ring gaskets are removably coupled to the second cylindrical metal coupling member;
providing a first cooling manifold having a first housing portion and a first port member, the first housing portion defining a first interior region, the first port member extending upwardly from a top surface of the first housing portion, the first port member fluidly communicating with the first interior region;
providing a second cooling manifold having a second housing portion and a second port member, the second housing portion defining a second interior region, the second port member extending upwardly from a top surface of the second housing portion, the second port member fluidly communicating with the second interior region;
disposing the first cylindrical metal coupling member into an aperture of the first port member of the first cooling manifold such that the first and second O-ring gaskets form first and second fluid-tight seals, respectively, with an inner surface of the first port member of the first cooling manifold; and
disposing the second cylindrical metal coupling member into an aperture of the second port member of the second cooling manifold such that the third and fourth O-ring gaskets form first and second fluid-tight seals, respectively, with an inner surface of the second port member of the second cooling manifold.

10. The battery cell assembly of claim 1, wherein the first O-ring gasket has a wall with a substantially circular-shaped cross-sectional profile, and a depth of the first groove of the first cylindrical aluminum coupling member being greater than a radius of the circular-shaped cross-sectional profile of the wall of the first O-ring gasket.

11. The battery cell assembly of claim 10, wherein the first cooling manifold is a plastic cooling manifold; and the first port has a tubular-shaped wall that extends upwardly from the top surface of the first housing portion a third distance, and further extends downwardly from the top surface of the first housing portion into the first interior region a fourth distance greater than the third distance.

12. A battery cell assembly, comprising:
a cooling fin having a tube, a substantially rectangular-shaped metal plate, first and second cylindrical coupling members, and first, second, third and fourth O-ring gaskets;
the tube having an inlet tube portion and an outlet tube portion, the tube being disposed on and coupled to a peripheral region of the substantially rectangular-shaped metal plate;
the first cylindrical coupling member having a first aperture extending therethrough that defines an interior surface of the first cylindrical coupling member, the first cylindrical coupling member further having first and second circumferential grooves extending around the first cylindrical coupling member; the inlet tube portion being disposed in the first aperture such that an exterior surface of the inlet tube portion directly contacts the interior surface of the first cylindrical coupling member, and the inlet tube portion being fixedly coupled to the first cylindrical coupling member;

each of the first and second O-ring gaskets having a wall with a substantially circular-shaped cross-sectional profile, the first and second O-ring gaskets being disposed in the first and second circumferential grooves, respectively, such that the first and second O-ring gaskets are removably coupled to the first cylindrical coupling member and are spaced apart from one another a first distance;

the second cylindrical coupling member having a second aperture extending therethrough that defines an interior surface of the second cylindrical coupling member, the second cylindrical coupling member further having third and fourth circumferential grooves extending around the second cylindrical coupling member; the outlet tube portion being disposed in the second aperture such that an exterior surface of the outlet tube portion directly contacts the interior surface of the second cylindrical coupling member, and the outlet tube portion being fixedly coupled to the second cylindrical coupling member;

each of the third and fourth O-ring gaskets having a wall with a substantially circular-shaped cross-sectional profile, the third and fourth O-ring gaskets being disposed in the third and fourth circumferential grooves, respectively, such that the third and fourth O-ring gaskets are removably coupled to the second cylindrical coupling member and being spaced apart from one another a second distance;

first and second battery cells being disposed against first and second sides, respectively, of the cooling fin; and a first cooling manifold having a first housing portion, a first inlet member, a first outlet member, and a first port member, the first housing portion defining a first interior region, the first port member being coupled to the first housing portion and fluidly communicating with the first interior region, the first inlet member and the first outlet member fluidly communicating with the first interior region, the first cylindrical coupling member being fluidly and removably coupled to the first port member such that the first and second O-ring gaskets form first and second fluid-tight seals, respectively, with an interior surface of the first port member.

13. The battery cell assembly of claim 12, further comprising a second cooling manifold having a second housing portion, a second inlet member, a second outlet member, and a first port member, the second housing portion defining a second interior region, the second port member extending upwardly from a top surface of the second housing portion and fluidly communicating with the second interior region, the second inlet member and the second outlet member fluidly communicating with the second interior region, the second cylindrical coupling member being fluidly and removably coupled to the second port member such that the third and fourth O-ring gaskets form third and fourth fluid-tight seals, respectively, with an interior surface of the second port member.

14. The battery cell assembly of claim 12, wherein a depth of the first groove of the first cylindrical aluminum coupling member being greater than a radius of the circular-shaped cross-sectional profile of the wall of the first O-ring gasket.

15. The battery cell assembly of claim 12, wherein the first cooling manifold is a plastic cooling manifold; and the first port has a tubular-shaped wall that extends upwardly from the top surface of the first housing portion a third distance, and further extends downwardly from the top surface of the first housing portion into the first interior region a fourth distance greater than the third distance.

* * * * *